United States Patent
Chen

(10) Patent No.: US 10,511,698 B1
(45) Date of Patent: Dec. 17, 2019

(54) ELECTRONIC DEVICE HAVING HIDDEN REGION AND CONTROL METHOD THEREOF

(71) Applicant: WUHAN CHINA STAR OPTOELECTRONICS SEMICONDUCTOR DISPLAY TECHNOLOGY CO., LTD., Wuhan, Hubei (CN)

(72) Inventor: Jun Chen, Guangdong (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 1 day.

(21) Appl. No.: 15/740,314

(22) PCT Filed: Nov. 23, 2017

(86) PCT No.: PCT/CN2017/112469
§ 371 (c)(1),
(2) Date: Aug. 29, 2018

(87) PCT Pub. No.: WO2019/085071
PCT Pub. Date: May 9, 2019

(30) Foreign Application Priority Data

Nov. 2, 2017 (CN) .......................... 2017 1 1074613

(51) Int. Cl.
*H04M 1/00* (2006.01)
*H04M 1/02* (2006.01)
*H04M 1/725* (2006.01)

(52) U.S. Cl.
CPC ....... *H04M 1/0266* (2013.01); *H04M 1/0264* (2013.01); *H04M 1/72563* (2013.01)

(58) Field of Classification Search
CPC .......... H04M 1/72519; H04M 1/0202; H04M 2250/12; H04M 1/0266; H04M 2250/22; H04M 1/72563; H04M 1/0264
See application file for complete search history.

(56) References Cited

U.S. PATENT DOCUMENTS

2007/0252804 A1* 11/2007 Engel ....................... G09G 3/36
345/98
2016/0011731 A1* 1/2016 Pasquero .............. G06F 3/0484
715/799
(Continued)

FOREIGN PATENT DOCUMENTS

CN 106057856 A 10/2016
CN 205844639 U 12/2016
(Continued)

*Primary Examiner* — Nhan T Le
(74) *Attorney, Agent, or Firm* — Hemisphere Law, PLLC; Zhigang Ma

(57) ABSTRACT

An electronic device having a hidden region and a control method thereof are provided. The electronic device includes a display screen and a hidden region located in the display screen. The display screen includes a display layer and a dimming layer located below the display layer. The hidden region includes multiple functional elements. The functional elements are disposed below the dimming layer. When the dimming layer receives a first signal, the dimming layer corresponding to the hidden region becomes transparent. The functional elements are in a visible state. When the light-adjusting receives a second signal, the dimming layer corresponding to the hidden region becomes opaque. The functional elements are in a hidden state. By disposing the functional elements below the hidden region, the problem that the electronic device cannot achieve full screen can be solved.

13 Claims, 6 Drawing Sheets

(56) References Cited

U.S. PATENT DOCUMENTS

2019/0227309 A1* 7/2019 Kadono ............. G02B 27/0101
2019/0317254 A1* 10/2019 Brown ................... G02F 1/153

FOREIGN PATENT DOCUMENTS

| CN | 106603772 A | 4/2017 |
| CN | 106774689 A | 5/2017 |
| CN | 106920470 A | 7/2017 |
| CN | 106921767 A | 7/2017 |
| JP | 2015-102941 A | 6/2015 |

* cited by examiner

ELECTRONIC DEVICE HAVING HIDDEN REGION AND CONTROL METHOD THEREOF

RELATED APPLICATIONS

The present application is a National Phase of International Application Number PCT/CN2017/112469, filed on Nov. 23, 2017, and claims the priority of China Application No. 201711074613.X, filed on Nov. 2, 2017, the entirety of which is incorporated by reference herein.

FIELD OF THE DISCLOSURE

The disclosure relates to a display technical field, and more particularly to an electronic device having a hidden region and a control method thereof.

BACKGROUND

With the continuous development of display technologies and the public needs, mobile electronic devices, such as mobile phones, tablets, etc., are becoming more and more popular in people's daily lives. Their functions increase and are more widely used. By observing the market of mobile electronic devices in recent years, it can be seen that the high screen-to-body ratio is an irresistible trend. In addition, compared to the existing electronic devices, the electronic devices with a high screen-to-body ratio have advantages including a larger display area, a narrower frame, a smaller dimension with the same size screen size, and so on. However, there are some necessary functional elements, such as a camera, an infra-red sensor, an iris camera, an earpiece, etc., on the front panel of the electronic device. Accordingly, the display screen of the current electronic device needs to conceal these elements. Full-screen display cannot be achieved.

SUMMARY

The disclosure mainly provides an electronic device having a hidden region and a control method thereof. The objective of the disclosure is to solve the problem that the electronic device cannot achieve full screen.

In order to solve the above technical problem, one technical solution adopted by the disclosure is: providing an electronic device having a hidden region. The electronic device comprises a display screen and the hidden region located in the display screen. The display screen comprises a display layer and a dimming layer located below the display layer. The hidden region comprises multiple functional elements. The functional elements are disposed below the dimming layer. When the dimming layer receives a first signal, a region of the dimming layer corresponding to the hidden region becomes transparent. The functional elements are in a visible state. When the light-adjusting receives a second signal, the region of the dimming layer corresponding to the hidden region becomes opaque. The functional elements are in a hidden state. The functional elements comprise one or a combination having several of a camera, an infra-red sensor, an iris camera, and an earpiece. The functional elements are controlled to be at the visible state or the hidden state through a manual mode or an automatic mode. Each of the functional elements is individually hidden or visible, some of the functional elements are hidden or visible together, or all of the functional elements are hidden or visible together. The region of the dimming layer corresponding to the hidden region is controlled to become transparent or opaque through electric control, temperature control, light control, or pressure control.

In order to solve the above technical problem, another technical solution adopted by the disclosure is: providing an electronic device having a hidden region. The electronic device comprises a display screen and the hidden region located in the display screen. The display screen comprises a display layer and a dimming layer located below the display layer. The hidden region comprises multiple functional elements. The functional elements are disposed below the dimming layer. When the dimming layer receives a first signal, a region of the dimming layer corresponding to the hidden region becomes transparent. The functional elements are in a visible state. When the light-adjusting receives a second signal, the region of the dimming layer corresponding to the hidden region becomes opaque. The functional elements are in a hidden state.

In order to solve the above technical problem, yet another technical solution adopted by the disclosure is: providing a control method of an electronic device having a hidden region. The method comprises: receiving an instruction and determining whether the instruction is an instruction for using functional elements of the hidden region. If yes, a region of the dimming layer corresponding to the hidden region receives a first signal and becomes transparent. The functional elements are in a visible state. If no, the region of the dimming layer corresponding to the hidden region receives a second signal and becomes opaque. The functional elements are in a hidden state.

The beneficial effects of the disclosure are as follows: By disposing the functional elements below the hidden region, the visibility and hiding of the functional elements are realized depending on whether the dimming layer corresponding to the hidden region is transparent or not. The problem that the electronic device cannot achieve full screen can be solved. The screen-to-body ratio of the electronic device is increased. The integrality of the display screen is enhanced.

DETAILED DESCRIPTION OF PREFERRED EMBODIMENTS

Figure 1:
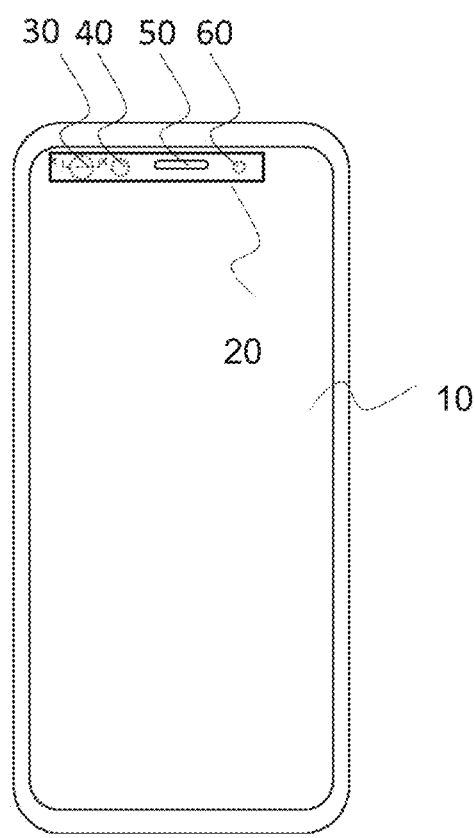
FIG. 1 is a structural schematic view of a first embodiment of an electronic device having a hidden region according to the disclosure.
Figure 2:
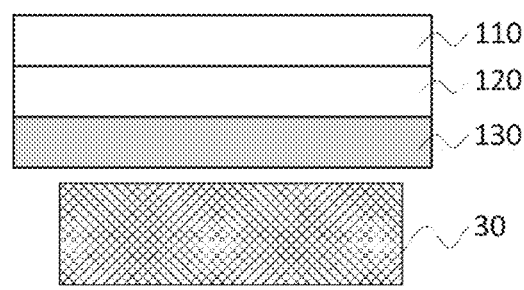
FIG. 2 is across-sectional schematic view of the hidden region in FIG. 1.

Referring to FIG. 1, it is a structural schematic view of a first embodiment of an electronic device having a hidden region according to the disclosure. The electronic device comprises a display screen 10 and a hidden region 20. Other elements and functions in the electronic device are the same as those in the existing electronic device and will not be described herein. The electronic device may be a mobile phone, a tablet, a touch screen, and so on. The display screen may be a LCD, an OLE©, a Micro-LED, an electronic paper, and so on. The hidden region comprises multiple functional elements, such as a camera 30, an iris camera 40, an infra-red sensor (IR sensor) 60, an earpiece 50, and so on. All of the functional elements can be disposed in an immersion way to be hidden below the hidden region 20 so as to ensure the integrality of the screen display. Referring to FIG. 2, it is a cross-sectional schematic view of the camera 30 along the line X-X in FIG. 1. From the top to the bottom, there are a protective cover plate 110, a display layer 120, and a dimming layer 130 disposed there below (a polarizer, a control layer and other parts are omitted). Other functional elements are stacked in the same way as the camera 30. When these functional elements are not in use, the display screen 10 is all in a normal display state. That is, the region of the dimming layer 130 corresponding to the hidden region 20 is in an opaque state. The hidden region 20 displays a screen consistent with other regions of the display screen 10. These functional elements of the hidden region are not seen from the front side of the entire display screen 10. When these functional elements of the hidden region need to be used, the hidden region 20 pauses inputting data of the display screen. The region of the dimming layer 130 corresponding to the hidden region 20 turns to a transparent state. As a result, the functional elements become visible. The size of the hidden region 20 is determined by the size of the functional elements and the overall arrangement. When the region of the dimming layer 130 corresponding to the hidden region 20 enters in the transparent state, the hidden region may be completely transparent or partially transparent. It is determined by the size and arrangement of the functional elements of the hidden region and the situation of using functional elements.

In this embodiment, in order to normally implement the self-function of the earpiece 50, an avoidance region can be optionally formed in the hidden region 20 by contour cutting, laser drilling or another process. Therefore, the sound of the earpiece 50 can be transmitted out through the screen. It has no requirement for sound transmission on the screen material. The avoidance region can be formed as finely as possible to prevent impact on the display effect of the overall screen. Alternatively, a screen material with resonance function can be used. The formation of the avoidance region, which is generally considered sound hole, can be omitted. As a result, the sound of the earpiece may not be transmitted out through the sound hole on the screen. The sound in the earpiece can be transmitted to human ears through resonance of the screen.

In the disclosure, the protective cover plate 110 and the display layer 120 are both transparent. Therefore, whether the hidden region 20 is transparent or not depends on whether the region of the dimming layer 130 corresponding to the hidden region 20 is transparent or not. The dimming layer 130 receives a first signal and a second signal transmitted by electric control, temperature control, light control, pressure control, and so on. Accordingly, the switching between the transparent and opaque states of its region corresponding to the hidden region 20 can be realized. Taking electronic control as an example, the region of the dimming layer 130 corresponding to the hidden region 20 can show two states of transparency and opacity in power-on and power-off states. For example, when the first signal is power-on, the region of the dimming layer 130 corresponding to the hidden region 20 becomes transparent. When the second signal is power-off, the region of the dimming layer 130 corresponding to the hidden region 20 becomes opaque.

Alternatively, when the first signal is power-on, the region of the dimming layer 130 corresponding to the hidden region 20 becomes opaque. When the second signal is power-off, the region of the dimming layer 130 corresponding to the hidden region 20 becomes transparent. The above situations are only examples of a specific working principle, but it is not meant to be limited to such situations.

Figure 3:
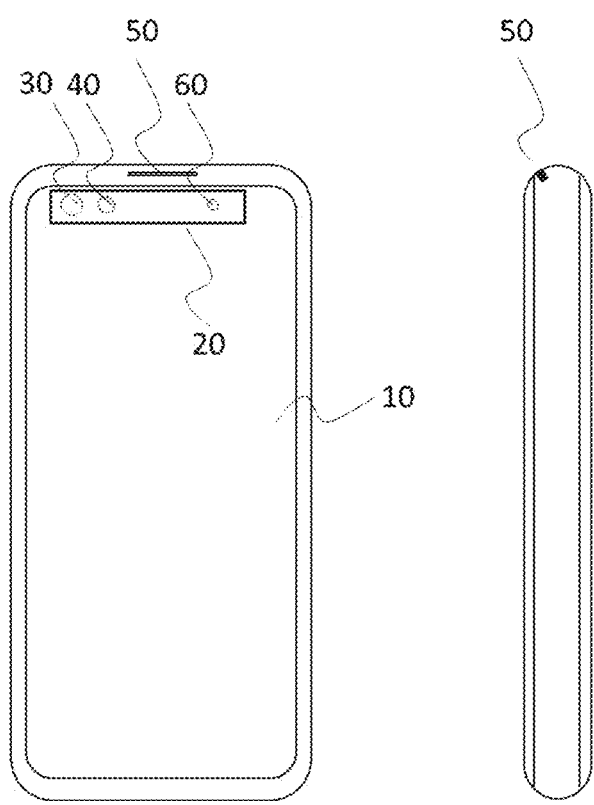
FIG. 3 is a structural schematic view of a second embodiment of an electronic device having a hidden region according to the disclosure.

Referring to FIG. 3, it is a structural schematic view of a second embodiment of an electronic device having a hidden region according to the disclosure. The difference between the second embodiment of the electronic device and the above first embodiment is: arranging the earpiece 50 in an elongated shape. As a result, it can be disposed on the middle frame of the electronic device. Whether the elongated shape earpiece is continuous or not may depend on the size of the electronic device or other objective conditions. In this way, it can prevent the display screen from forming the avoidance region of the earpiece hole, which is formed by contour cutting, laser drilling or another method. Accordingly, the screen-to-body ratio is increased even further. The integrality of the display screen is improved. The difficulty of manufacturing the display screen is also reduced. The arrangement and control of other functional elements are the same as those of the functional elements in the first embodiment described above. Therefore, they are not described again herein.

Figure 4:
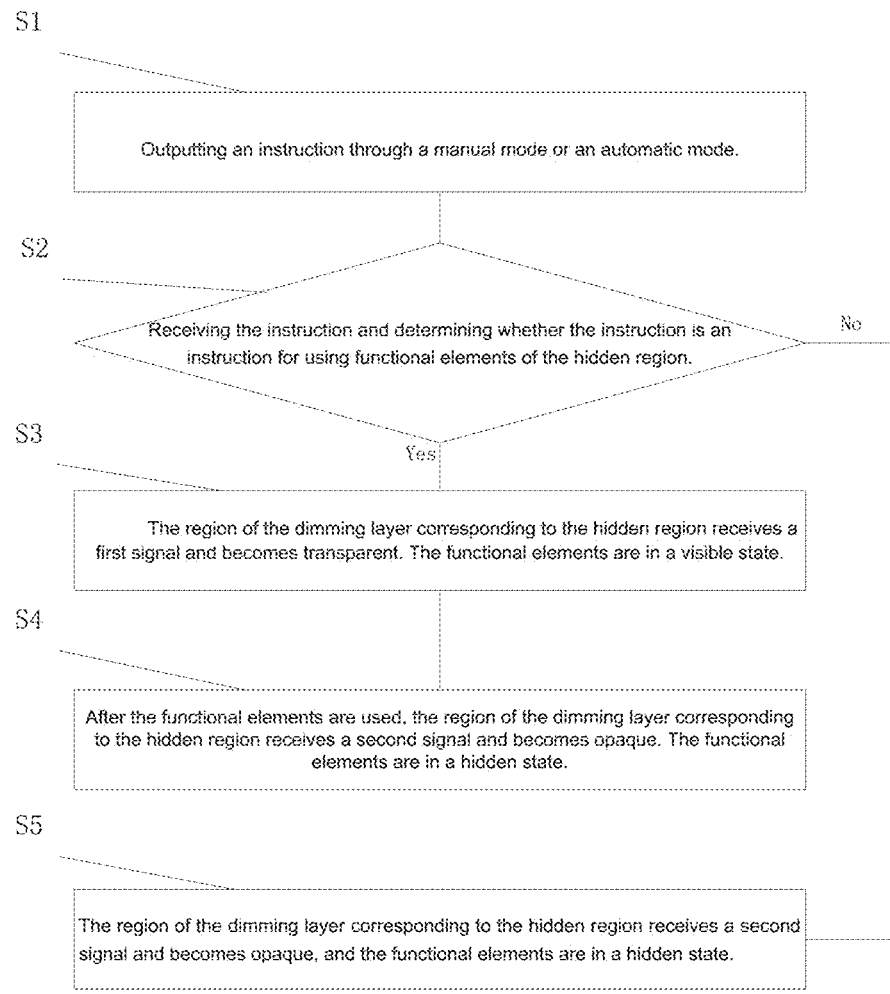
FIG. 4 is a schematic flowchart of a control method of an electronic device having a hidden region according to the disclosure.

Referring to FIG. 4, it is a schematic flowchart of a control method of an electronic device having a hidden region according to the disclosure. The method comprises the steps of:

Step S1: Outputting an instruction through a manual mode or an automatic mode.

Step S2: Receiving the instruction and determining whether the instruction is an instruction for using functional elements of the hidden region. If yes, go to Step S3. If no, go to Step S5.

Step S3: The region of the dimming layer 130 corresponding to the hidden region 20 receives a first signal and becomes transparent. The functional elements are in a visible state.

Step S4: After the functional elements are used, the region of the dimming layer 130 corresponding to the hidden region 20 receives a second signal and becomes opaque. The functional elements are in a hidden state.

Step S5: The region of the dimming layer 130 corresponding to the hidden region 20 receives a second signal and becomes opaque, and the functional elements are in a hidden state.

The CPU sends out the instruction of whether to use the functional elements of the hidden region. If no, the functional elements of the hidden region are in a hidden state. If yes, the display data inputting in the hidden region is turned off. As a result, the hidden region 20 is turned into a non-display state. At the same time, the dimming layer 130 receives a signal. The region corresponding to the hidden region 20 becomes a transparent state such that the hidden region is changed from the non-display state to the transparent state. Accordingly, the functional elements of the hidden region can be seen and start to work. After the work is completed, the dimming layer 130 receives a signal, and then the region corresponding to the hidden region 20 becomes an opaque state. At the same time, the display data inputting in the hidden region 20 is turned on. As a result, the hidden region 20 is turned into a normal display state. The functional elements of the hidden region become a hidden state.

In this embodiment, one case of the camera 30 is taken as an example to specifically illustrate the operation method. In this case, the region of the dimming layer 130 corresponding to the hidden region 20 becomes transparent after the power is turned off. After the power is turned on, the region of the dimming layer 130 corresponding to the hidden region 20 becomes opaque. The specific operation method is as follows: The CPU sends out the instruction of whether to use the camera 30 or not. If no, the camera 30 is in a hidden state. If yes, the instruction to call the camera 30 get ready. The display data inputting in the hidden region 20 is turned off. As a result, the hidden region 20 is turned into a non-display state. At the same time, the region of the dimming layer 130 corresponding to the hidden region 20 receives a signal and is powered off such that it becomes a transparent state. Accordingly, the hidden region 20 is changed from the non-display state to the transparent state and then the camera 30 can be seen. After the camera 30 finishes the work, the region of the dimming layer 130 corresponding to the hidden region 20 receives a signal and is powered on such that it becomes an opaque state. The hidden region 20 becomes a displayable state. Afterwards, the display data inputting in the hidden region 20 is turned on. At this moment, the camera 30 returns to the immersive hidden state.

The operation method to realize the immersive hidden state of other elements, such as the IR sensor 60, the iris camera 40, etc., is substantially the same as the above method and are not described herein. It should be further explained that the CPU can simultaneously send out instructions to all the function elements of the hidden region. As a result, the immersive hidden state of all the function elements are turned on or off together. In other words, the camera 30, the iris camera 40, the IR sensor 60, etc., are simultaneously visible or enter into a hidden state together after sending the system instructions. It is also possible for the CPU to send the instruction to one or several of the functional elements, and then the selected one or several functional elements enter into a hidden state or a visible state. Taking this embodiment as an example, the camera 30, the iris camera 40, the IR sensor 60, etc., can be individually controlled whether they are hidden or not, that is, the functional elements do not influence each other and are independent of each other.

Figure 5A:
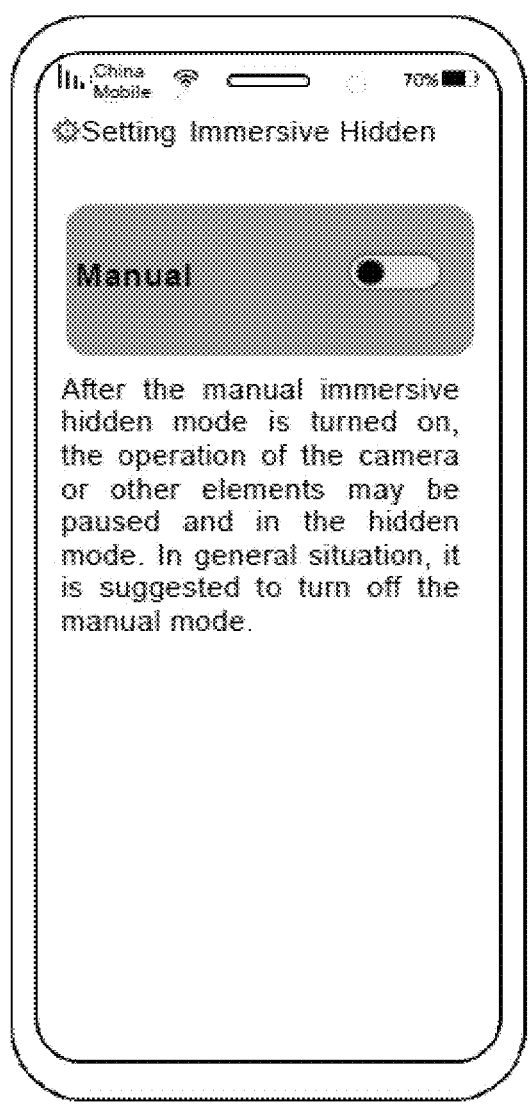
FIG. 5a, FIG. 5b and FIG. 5c are schematic views of a control interface of an electronic device having a hidden region according to the disclosure.
Figure 5B:
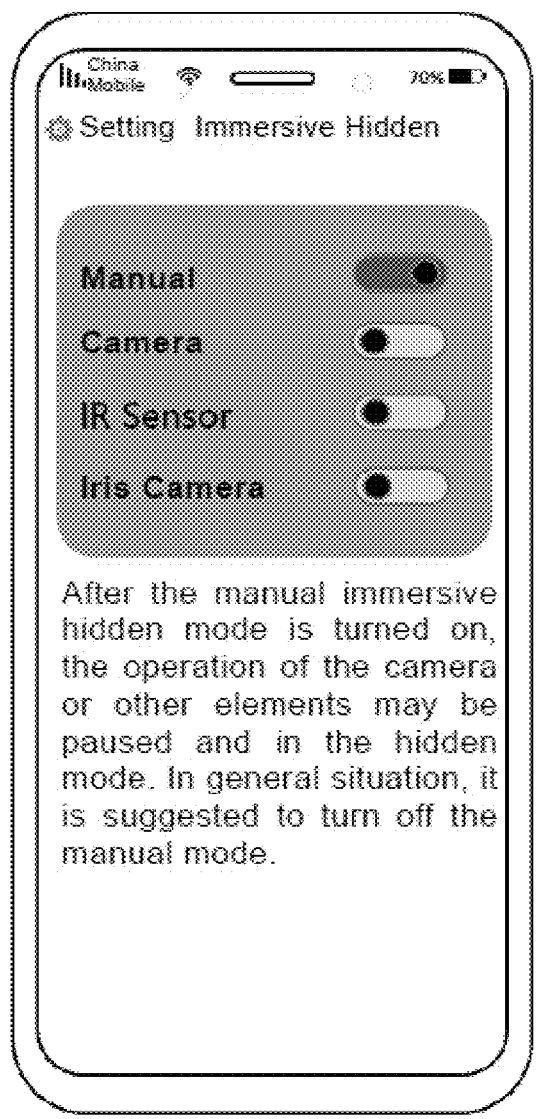
Figure 5C:
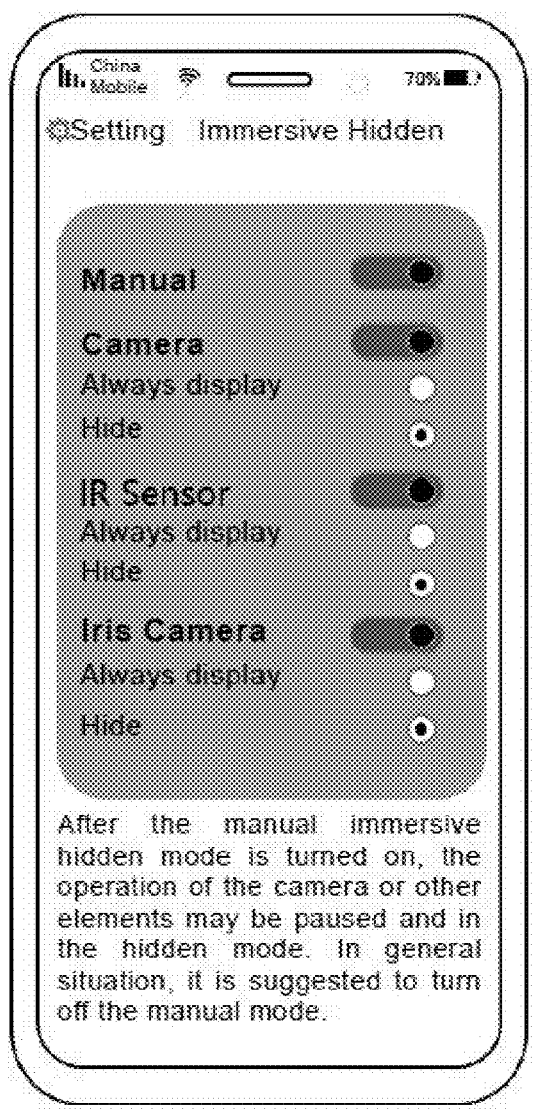

Referring to FIG. 5*a*, FIG. 5*b* and FIG. 5*c*, they are schematic views of a control interface of an electronic device having a hidden region according to the disclosure. In the figures, a mobile phone with an immersive hidden function and functional elements including the camera 30, the iris camera 40, the IR sensor 60, etc., are taken as examples to describe the system control schematic interface and the brief control logic. As shown in FIG. 5*a*, in the mobile phone, a manual turn-on mode is set for the immersive hidden function. When the manual mode is turned off, the immersive hidden function enters into an automatic mode, which is automatically controlled by the system. Specifically, FIG. 5*a* shows a situation that the manual mode is turned off (i.e. the automatic mode). The immersive hidden function of all the functional elements is automatically controlled by the system. In manual mode, all the functional elements are suspended and in a hidden state. As shown in FIG. 5*b*, when the manual mode is turned on, all the functional elements can be independently controlled. For example, the camera 30 can be selected to be visible or hidden. As shown in FIG. 5*c*, when the manual mode is turned on, all the functional elements can be individually controlled to enter into a visible or hidden, state. That is, two options of visible/hidden are added under each functional element. For example, in the manual mode, the camera 30 can be manually hidden while the IR sensor 60 can be manually selected to be visible at the same time. At this moment, if the independent manual mode of the iris camera 40 is turned off, its hidden and visible states are under the automatic control of the system until the state is canceled. The above control method is an example for illustration. A new control method may be formed by easy mutual combination and variation. The disclosure is not limited to the above control method.

In the disclosure, by disposing the functional elements below the hidden region 20, the visibility and hiding of the functional elements are realized depending on whether the dimming layer 130 corresponding to the hidden region is transparent or not. The problem that the electronic device cannot achieve full screen can be solved. The screen-to-body ratio of the electronic device is increased. The integrality of the display screen is enhanced.

The above descriptions are only embodiments of the disclosure, and does not intend to limit the protection scope of the disclosure. Variations of equivalent structure or equivalent process based on the specification and the accompanying drawings of the disclosure, or direct or indirect implement in other related technologies are all included in the protection scope of the disclosure.

What is claimed is:

1. An electronic device having a hidden region, wherein the electronic device comprises a display screen and the hidden region located in the display screen, wherein the display screen comprises a display layer and a dimming layer located below the display layer, wherein the hidden region comprises multiple functional elements, and the functional elements are disposed below the dimming layer, wherein when the dimming layer receives a first signal, a region of the dimming layer corresponding to the hidden region becomes transparent, and the functional elements are in a visible state, wherein when the light-adjusting receives a second signal, the region of the dimming layer corresponding to the hidden region becomes opaque, and the functional elements are in a hidden state, wherein the functional elements comprise one or a combination having several of a camera, an infra-red sensor, an iris camera, and an earpiece, wherein the functional elements are controlled to be at the visible state or the hidden state through a manual mode or an automatic mode, wherein each of the functional elements is individually hidden or visible, some of the functional elements are hidden or visible together, or all of the functional elements are hidden or visible together, wherein the region of the dimming layer corresponding to the hidden region is controlled to become transparent or opaque through electric control, temperature control, light control, or pressure control.

2. The electronic device as claimed in claim 1, wherein the earpiece is disposed in the hidden region, and an avoidance region is formed by contour cutting or laser drilling.

3. The electronic device as claimed in claim 2, wherein the earpiece has an elongated shape and is disposed on a middle frame of the electronic device.

4. An electronic device having a hidden region, wherein the electronic device comprises a display screen and the hidden region located in the display screen, wherein the display screen comprises a display layer and a dimming layer located below the display layer, wherein the hidden region comprises multiple functional elements, and the functional elements are disposed below the dimming layer, wherein when the dimming layer receives a first signal, a region of the dimming layer corresponding to the hidden region becomes transparent, and the functional elements are in a visible state, wherein when the light-adjusting receives a second signal, the region of the dimming layer corresponding to the hidden region becomes opaque, and the functional elements are in a hidden state.

5. The electronic device as claimed in claim 4, wherein the functional elements comprise one or a combination having several of a camera, an infra-red sensor, an iris camera, and an earpiece, wherein the functional elements are controlled to be at the visible state or the hidden state through a manual mode or an automatic mode, wherein each of the functional elements is individually hidden or visible, some of the functional elements are hidden or visible together, or all of the functional elements are hidden or visible together.

6. The electronic device as claimed in claim 4, wherein the region of the dimming layer corresponding to the hidden region is controlled to become transparent or opaque through electric control, temperature control, light control, or pressure control.

7. The electronic device as claimed in claim 5, wherein the earpiece is disposed in the hidden region, and an avoidance region is formed by contour cutting or laser drilling.

8. The electronic device as claimed in claim 5, wherein the earpiece has an elongated type and is disposed on a middle frame of the electronic device.

9. A control method of an electronic device having a hidden region, wherein the method comprises:
  receiving an instruction and determining whether the instruction is an instruction for using functional elements of the hidden region,
  if yes, a region of a dimming layer corresponding to the hidden region receives a first signal and becomes transparent, and the functional elements are in a visible state; and
  if no, the region of the dimming layer corresponding to the hidden region receives a second signal and becomes opaque, and the functional elements are in a hidden state.

10. The control method of an electronic device having a hidden region as claimed in claim 9, wherein before the receiving of the instruction and the determination of whether the instruction is the instruction for using the functional elements of the hidden region,
  the instruction is output through a manual mode or an automatic mode.

11. The control method of an electronic device having a hidden region as claimed in claim 10, wherein the outputting of the instruction through the manual mode or the automatic mode comprises:
  each of the functional elements is individually hidden or visible, some of the functional elements are hidden or visible together, or all of the functional elements are hidden or visible together.

12. The control method of an electronic device having a hidden region as claimed in claim 9, wherein after the region of the dimming layer corresponding to the hidden region receives the first signal and become transparent, and the functional elements are at the visible state, the control method comprises:
  after using the functional elements, the region of the dimming layer corresponding to the hidden region receives the second signal and becomes opaque, and the functional elements are at the hidden state.

13. The control method of an electronic device having a hidden region as claimed in claim 9, wherein the functional elements comprise one or a combination having several of a camera, an infra-red sensor, an iris camera, and an earpiece.

* * * * *